US012155416B2

(12) United States Patent
Hazani

(10) Patent No.: US 12,155,416 B2
(45) Date of Patent: Nov. 26, 2024

(54) SYSTEMS FOR LOW POWER DISTRIBUTION IN A POWER DISTRIBUTION NETWORK

(71) Applicant: Corning Research & Development Corporation, Corning, NY (US)

(72) Inventor: Ami Hazani, Raanana (IL)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 14 days.

(21) Appl. No.: 18/119,471

(22) Filed: Mar. 9, 2023

(65) Prior Publication Data
US 2023/0208523 A1   Jun. 29, 2023

Related U.S. Application Data

(62) Division of application No. 17/363,068, filed on Jun. 30, 2021, now Pat. No. 11,621,776.
(Continued)

(51) Int. Cl.
*H04B 10/2575* (2013.01)
*H04B 3/54* (2006.01)
*H04B 10/80* (2013.01)

(52) U.S. Cl.
CPC ....... *H04B 10/25758* (2013.01); *H04B 3/548* (2013.01); *H04B 10/808* (2013.01); *H04B 2203/547* (2013.01)

(58) Field of Classification Search
None
See application file for complete search history.

(56) References Cited

U.S. PATENT DOCUMENTS 5,345,053 A  *  9/1994  Kaneko ................. B23H 1/022
                                              219/69.18
5,774,316 A     6/1998  McGary et al.
(Continued)

FOREIGN PATENT DOCUMENTS

EP        1347607 A1    9/2003

OTHER PUBLICATIONS

Author unknown (maxim integrated), "Reverse-Current Circuitry Protection", https://www.analog.com/media/en/technical-documentation/design-notes/reversecurrent-circuitry-protection--maxim-integrated.pdf , application note 636, Jan. 31, 2001 (Year: 2001).*
(Continued)

*Primary Examiner* — Darren E Wolf
(74) *Attorney, Agent, or Firm* — William D. Doyle

(57) ABSTRACT

Systems for low power distribution in a power distribution network (PDN) contemplate using multiple low-power conductors to convey power from a power source to a remote sub-unit. The multiple conductors are isolated from one another to help prevent overcurrent conditions in a fault condition. In a first exemplary aspect, the isolation is provided by galvanic isolation. In a second exemplary aspect, the isolation is provided by diodes at the remote sub-units. Further, current sensors may be used at the power source to detect if any of the multiple low-power conductors are carrying current above a defined threshold current. By providing one or more of these safety features, a multiplexer may not be needed at the remote sub-unit, thus providing cost savings while preserving the desired safety features.

3 Claims, 14 Drawing Sheets

Related U.S. Application Data

(60) Provisional application No. 63/058,138, filed on Jul. 29, 2020.

(56) References Cited

U.S. PATENT DOCUMENTS

| | | | |
|---|---|---|---|
| 5,991,175 A * | 11/1999 | Liu | H03K 17/162 |
| | | | 361/101 |
| 6,584,197 B1 | 6/2003 | Boudreaux et al. | |
| 7,545,055 B2 | 6/2009 | Barrass | |
| 8,559,150 B2 | 10/2013 | Veroni | |
| 8,605,394 B2 | 12/2013 | Crookham et al. | |
| 8,781,637 B2 | 7/2014 | Eaves | |
| 9,042,732 B2 | 5/2015 | Cune et al. | |
| 9,240,835 B2 | 1/2016 | Berlin et al. | |
| 9,325,429 B2 | 4/2016 | Berlin et al. | |
| 9,497,706 B2 | 11/2016 | Atias et al. | |
| 9,532,329 B2 | 12/2016 | Sauer | |
| 9,673,904 B2 | 6/2017 | Palanisamy et al. | |
| 9,685,782 B2 | 6/2017 | Blackwell et al. | |
| 10,020,885 B2 | 7/2018 | Mizrahi et al. | |
| 10,257,056 B2 | 4/2019 | Hazani et al. | |
| 10,404,099 B1 | 9/2019 | Bonja et al. | |
| 10,405,356 B2 | 9/2019 | Hazani et al. | |
| 2002/0060889 A1 * | 5/2002 | Teutsch | H02H 11/003 |
| | | | 361/23 |
| 2003/0178979 A1 | 9/2003 | Cohen | |
| 2004/0169237 A1 * | 9/2004 | Nishikawa | H03K 19/00315 |
| | | | 257/401 |
| 2007/0221997 A1 * | 9/2007 | Chen | H02P 7/04 |
| | | | 257/379 |
| 2010/0231175 A1 * | 9/2010 | Noda | H02J 7/342 |
| | | | 320/162 |
| 2010/0288754 A1 | 11/2010 | Ookuma | |
| 2011/0007443 A1 | 1/2011 | Crookham et al. | |
| 2011/0223958 A1 | 9/2011 | Chen et al. | |
| 2013/0330086 A1 * | 12/2013 | Berlin | H04B 10/808 |
| | | | 398/115 |
| 2014/0243033 A1 | 8/2014 | Wala et al. | |
| 2014/0355991 A1 | 12/2014 | Cameirao et al. | |
| 2015/0077130 A1 | 3/2015 | Hackl | |
| 2015/0092307 A1 * | 4/2015 | Petruzzi | H01L 27/0248 |
| | | | 361/56 |
| 2015/0207318 A1 | 7/2015 | Lowe et al. | |
| 2015/0215001 A1 | 7/2015 | Eaves | |
| 2015/0229397 A1 | 8/2015 | Shibata et al. | |
| 2016/0344212 A1 * | 11/2016 | Murano | H02J 3/50 |
| 2016/0352393 A1 | 12/2016 | Berlin et al. | |
| 2017/0025842 A1 | 1/2017 | Peterson | |
| 2017/0034716 A1 | 2/2017 | Dortschy et al. | |
| 2017/0054496 A1 | 2/2017 | Hazani | |
| 2017/0070975 A1 | 3/2017 | Ranson et al. | |
| 2018/0351633 A1 | 12/2018 | Birkmeir et al. | |
| 2021/0257829 A1 * | 8/2021 | Lau | H02M 1/0064 |

OTHER PUBLICATIONS

Stokes, "Reverse Current Protection in Load Switches", https://www.ti.com/lit/an/slva730/slva730.pdf?ts=1714681213982&ref_url=https%253A%252F%252Fwww.google.com%252F, Texas Instruments, Application Report, SLVA730, May 2016 (Year: 2016).*

Li, "Reverse Current Protection in Systems", DigiKey, https://forum.digikey.com/t/reverse-current-protection-in-a-system/1954, Oct. 2018 (Year: 2018).*

* cited by examiner

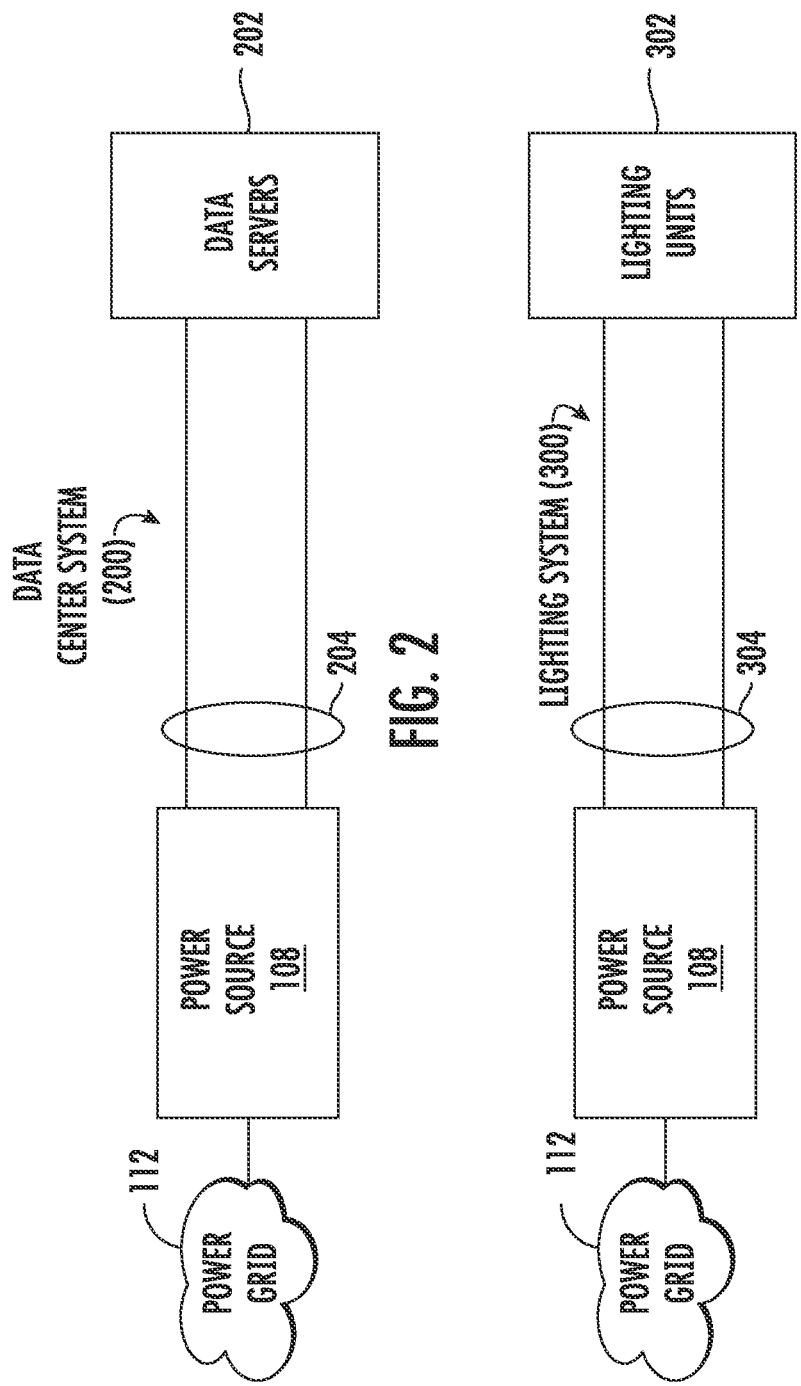

SYSTEMS FOR LOW POWER DISTRIBUTION IN A POWER DISTRIBUTION NETWORK

CROSS-REFERENCE TO RELATED APPLICATIONS

This application is a divisional of U.S. patent application Ser. No. 17/363,068 filed Jun. 30, 2021, which claims the benefit of priority under 35 U.S.C. § 119 of U.S. Provisional Application Ser. No. 63/058,138, filed Jul. 29, 2020, the content of which is relied upon and incorporated herein by reference in its entirety.

BACKGROUND

The technology of the disclosure relates to a power distribution network (PDN) and more particularly, to a low-power PDN.

Electrical devices require power. In many instances, the power may be provided by a battery or a local power source such as a wall outlet or the like. However, in some instances, it may be inconvenient to supply power through a wall outlet or a battery. For example, the power demands or voltage levels of the device being powered may exceed that which is available through the conventional wall outlets (e.g., the item may need 340 Volts (V) instead of the conventional 110 V supplied by most US power outlets). Or, the device may consume sufficient power that battery supplies are impractical. Likewise, the location may be such that a local power supply is not available. In such instances, there may be a dedicated PDN associated with such devices.

A few exemplary systems that may have associated PDNs include, but are not limited to, server farms, lighting systems, and distributed communication systems (DCSs) such as a distributed antenna system (DAS) or radio access network (RAN). Such systems may have a central power source and one or more power conductors that convey power from the power source to one or more remote sub-units (e.g., a server, a lighting fixture, a remote antenna unit, or the like). There is a concern that a human may come into contact with the power conductors and be shocked or electrocuted by such contact. Accordingly, some regulations, such as International Electric Code (IEC) 60950-21, may limit the amount of direct current (DC) that is remotely delivered by the power source over the conductors to less than the amount needed to power the remote sub-unit during peak power consumption periods for safety reasons.

One solution to remote power distribution limitations is to employ multiple conductors and split current from the power source over the multiple conductors, such that the power on any one electrical conductor is below the regulated limit. However, such multi-conductor arrangements may need complicated and expensive multiplexers at the remote sub-units.

No admission is made that any reference cited herein constitutes prior art. Applicant expressly reserves the right to challenge the accuracy and pertinency of any cited documents.

SUMMARY

Embodiments disclosed herein include systems for low power distribution in a power distribution network (PDN). In exemplary aspects, multiple low-power conductors are employed to convey power from a power source to a remote sub-unit. The multiple conductors are isolated from one another to help prevent overcurrent conditions in a fault condition. In a first exemplary aspect, the isolation is provided by galvanic isolation. In a second exemplary aspect, the isolation is provided by diodes at the remote sub-units. Further, current sensors may be used at the power source to detect if any of the multiple low-power conductors are carrying current above a defined threshold current. By providing one or more of these safety features, a multiplexer may not be needed at the remote sub-unit to prevent overcurrent situations, thus providing cost savings while preserving the desired safety features.

In this regard, in one embodiment, a remote sub-unit is disclosed. The remote sub-unit comprises a power input port configured to be coupled to two power conductors. The remote sub-unit also comprises a first diode coupled to the power input port and a first one of the two power conductors. The remote sub-unit also comprises a second diode coupled to the power input port and a second one of the two power conductors.

In another embodiment, a power source is disclosed. The power source comprises a power input configured to receive power. The power source also comprises a plurality of power outputs configured to operate at a low power level. Each of the plurality of power outputs is galvanically isolated from others of the plurality of power outputs by a respective transformer.

In another embodiment, a power source is disclosed. The power source comprises a power input configured to receive power. The power source also comprises a power output port configured to couple to a two-wire power conductor pair. The power source also comprises a first conductor coupling the power input to the power output port. The power source also comprises a first current sensor associated with the first conductor and configured to measure current on the first conductor. The power source also comprises a first switch associated with the first conductor. The power source also comprises a control circuit. The control circuit is configured to receive information from the first current sensor. The control circuit is also configured to open the first switch responsive to the information indicating an overcurrent situation on the first conductor.

In another embodiment, a PDN is disclosed. The PDN comprises a power source. The power source comprises a power input configured to receive power. The power source also comprises a power output port. The power source also comprises a first conductor coupling the power input to the power output port. The power source also comprises a first current sensor associated with the first conductor and configured to measure current on the first conductor. The power source also comprises a first switch associated with the first conductor. The power source also comprises a control circuit. The control circuit is configured to receive information from the first current sensor. The control circuit is also configured to open the first switch responsive to the information indicating an overcurrent situation on the first conductor. The PDN also comprises a power conductor pair coupled to the power output port. The PDN also comprises a remote sub-unit. The remote sub-unit comprises a remote sub-unit power input port coupled to the power conductor pair. The remote sub-unit also comprises a first diode coupled to the remote sub-unit power input port and a first one of the power conductor pair. The remote sub-unit also comprises a second diode coupled to the remote sub-unit power input port and a second one of the power conductor pair.

In another embodiment, a distributed communication system (DCS) is disclosed. The DCS comprises a PDN. The PDN comprises a power source. The power source comprises a power input configured to receive power. The power source also comprises a power output port. The power source also comprises a first conductor coupling the power input to the power output port. The power source also comprises a first current sensor associated with the first conductor and configured to measure current on the first conductor. The power source also comprises a first switch associated with the first conductor. The power source also comprises a control circuit. The control circuit is configured to receive information from the first current sensor. The control circuit is also configured to open the first switch responsive to the information indicating an overcurrent situation on the first conductor. The PDN also comprises a power conductor pair coupled to the power output port. The PDN also comprises a plurality of remote sub-units. Each remote sub-unit comprises a remote sub-unit power input port coupled to the power conductor pair. Each remote sub-unit also comprises a first diode coupled to the remote sub-unit power input port and a first one of the power conductor pair. Each remote sub-unit also comprises a second diode coupled to the remote sub-unit power input port and a second one of the power conductor pair. The DCS also comprises a central unit. The central unit is configured to distribute received one or more downlink communications signals over one or more downlink communications links to one or more remote sub-units. The central unit is also configured to distribute received one or more uplink communications signals from the one or more remote sub-units from one or more uplink communications links to one or more source communications outputs. Each remote sub-unit among the plurality of remote sub-units is configured to distribute the received one or more downlink communications signals received from the one or more downlink communications links to one or more client devices. Each remote sub-unit is also configured to distribute the received one or more uplink communications signals from the one or more client devices to the one or more uplink communications links.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 2 is a schematic diagram of an exemplary PDN for a server farm, where the PDN may have start-up protocols according to exemplary aspects of the present disclosure;

FIG. 3 is a schematic diagram of an exemplary PDN for a lighting system, where the PDN may have start-up protocols according to exemplary aspects of the present disclosure;

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include systems for low power distribution in a power distribution network (PDN). In particular, exemplary aspects of the present disclosure contemplate using multiple low-power conductors to convey power from a power source to a remote sub-unit. The multiple conductors are isolated from one another to help prevent overcurrent conditions in a fault condition. In a first exemplary aspect, the isolation is provided by galvanic isolation. In a second exemplary aspect, the isolation is provided by diodes at the remote sub-units. Further, current sensors may be used at the power source to detect if any of the multiple low-power conductors are carrying current above a defined threshold current. By providing one or more of these safety features, a multiplexer may not be needed at the remote sub-unit to prevent overcurrent situations, thus providing cost savings while preserving the desired safety features.

Figure 1:
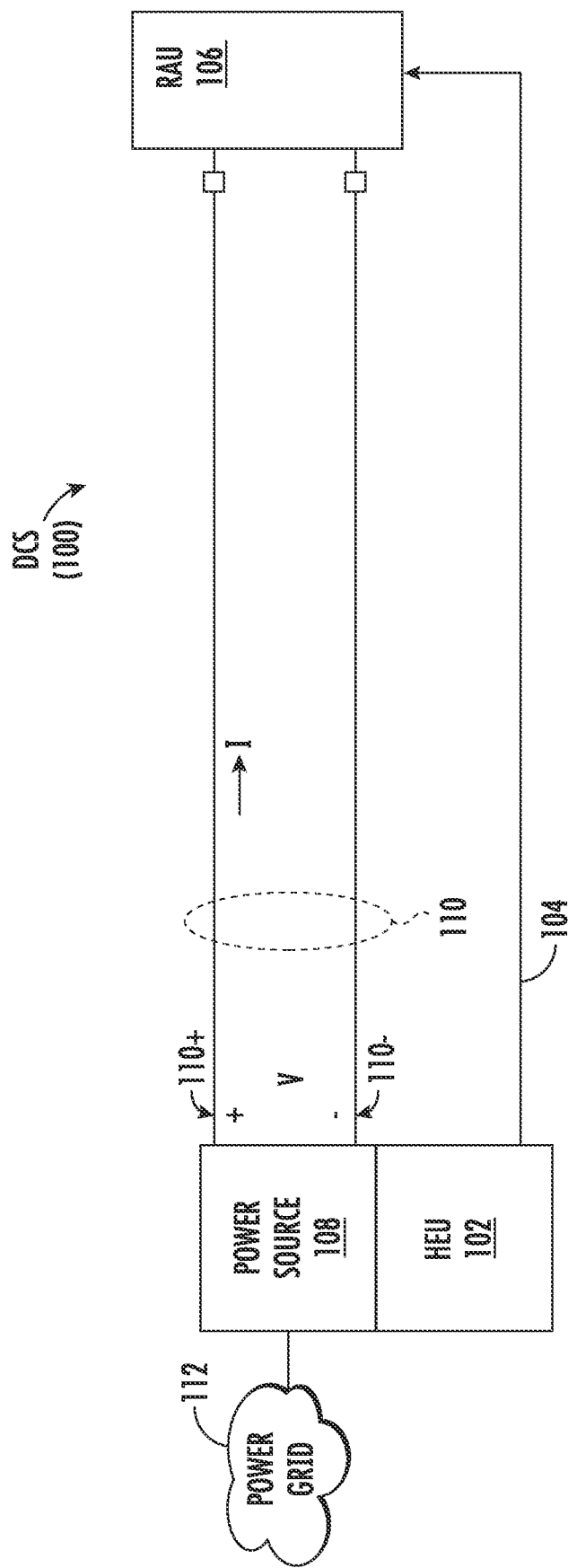
FIG. 1 is a schematic diagram of an exemplary power distribution network (PDN) for a distributed communication system (DCS), where the PDN may have start-up protocols according to exemplary aspects of the present disclosure.

A PDN rarely exists in isolation. Rather, a PDN provides infrastructure to some other system, a few of which are briefly discussed with reference to FIGS. 1-3. Some PDNs may provide power at voltage levels above 60 Volts (V) and over 100 Watts (W). However, other PDNs may fall below these thresholds and be categorized as low-power networks. Problems that may arise in PDNs such as those illustrated in FIGS. 1-3 are discussed with reference to FIGS. 4A-4C. Solutions according to the present disclosure are discussed below beginning with reference to FIG. 5.

In this regard, FIG. 1 illustrates a simplified block diagram of a distributed communication system (DCS) 100. The DCS 100 may include a head end unit (HEU) 102 that communicates through a communication medium 104 with a remote antenna unit (RAU) 106. The communication medium 104 may be a wire-based or optical fiber medium. The RAU 106 includes a transceiver and an antenna (not illustrated) that communicate wirelessly with mobile terminals and other user equipment (also not illustrated). Because the RAU 106 sends and receives wireless signals and may potentially perform other functions, the RAU 106 consumes power. That power may, in some instances, be provided locally. More commonly, and of interest to the present disclosure, the DCS 100 includes a PDN, and the RAU 106 receives power from a power source 108 that transmits power to the RAU 106 over power lines 110 formed from a positive power line 110+ and a negative power line 110−. The power lines 110 may be many meters long, for example, extending through an office building, across multiple floors of a multi-story building, or the like. Further, the power lines 110 may couple to multiple RAUs 106 (even though only one is illustrated in FIG. 1). The power source 108 may be coupled to an external power grid 112.

Similarly, FIG. 2 illustrates a data center system 200 having a power source 108 coupled to remote data servers 202 through power lines 204. The power source 108 is coupled to the external power grid 112. As with the RAU 106, the data servers 202 may consume power supplied through the power lines 204.

Similarly, FIG. 3 illustrates a lighting system 300 having a power source 108 coupled to remote lighting units 302 through power lines 304. The power source 108 is coupled to the external power grid 112. As with the RAU 106, the remote lighting units 302 may consume power supplied through the power lines 304.

It should be appreciated that there may be other contexts that may use a PDN, and the examples provided in FIGS. 1-3 are not intended to be limiting. As a note of nomenclature, the RAU 106, the remote data servers 202, and the lighting units 302 are remote sub-units.

The power requirements of the remote sub-units typically control how much power is provided to the remote sub-units through an associated PDN. Many governments provide regulations or statutes relating to how power may be provided to the remote sub-units through a PDN. Most such regulations or statutes come from standard settings bodies like Underwriters Laboratories (UL) or the National Fire Protection Association's National Electric Code (NEC). In many cases the UL standard and the NEC overlap such that compliance with one also means compliance with the other.

While there may be other ways to differentiate power provision, the present disclosure contemplates a high-power format and a low-power format based on the UL60950-1 provided by Underwriters Laboratories and NEC Class-2. Compliance with these two standards is considered herein a low-power format while providing power above the thresholds set by these two standards is considered herein a high-power format. These two standards require less than 60 V and less than 100 W. Additionally, the wire gauge used to comply with these standards is between thirty and twelve American wire gauge (30-12 AWG). Staying below these thresholds has the benefit of eliminating a requirement for a separate wiring conduit and does not require a licensed electrician to install.

As noted above, the requirements of the remote sub-unit may dictate how much power is supplied by the PDN. When the remote sub-unit requires more than 100 W of power, there are generally two ways such power requirements are satisfied. The first way is through a high-power format. Corning Optical Communications, assignee of the present disclosure, has several solutions that meet the requirements for a high-power format, and these approaches are not directly of interest to the present disclosure. The second way is to provide multiple power connections to the remote sub-unit from the power source, where each such connection complies with the low-power format.

While the concept of using multiple low-power format connections in a PDN seems simple, there may be situations where current from one connection may "spill over" or "spill onto" another connection. Such conditions may result in the low-power format thresholds being exceeded. A conventional PDN 400 is illustrated in FIG. 4A and two such fault conditions are illustrated herein with reference to FIGS. 4B and 4C.

Figure 4A:
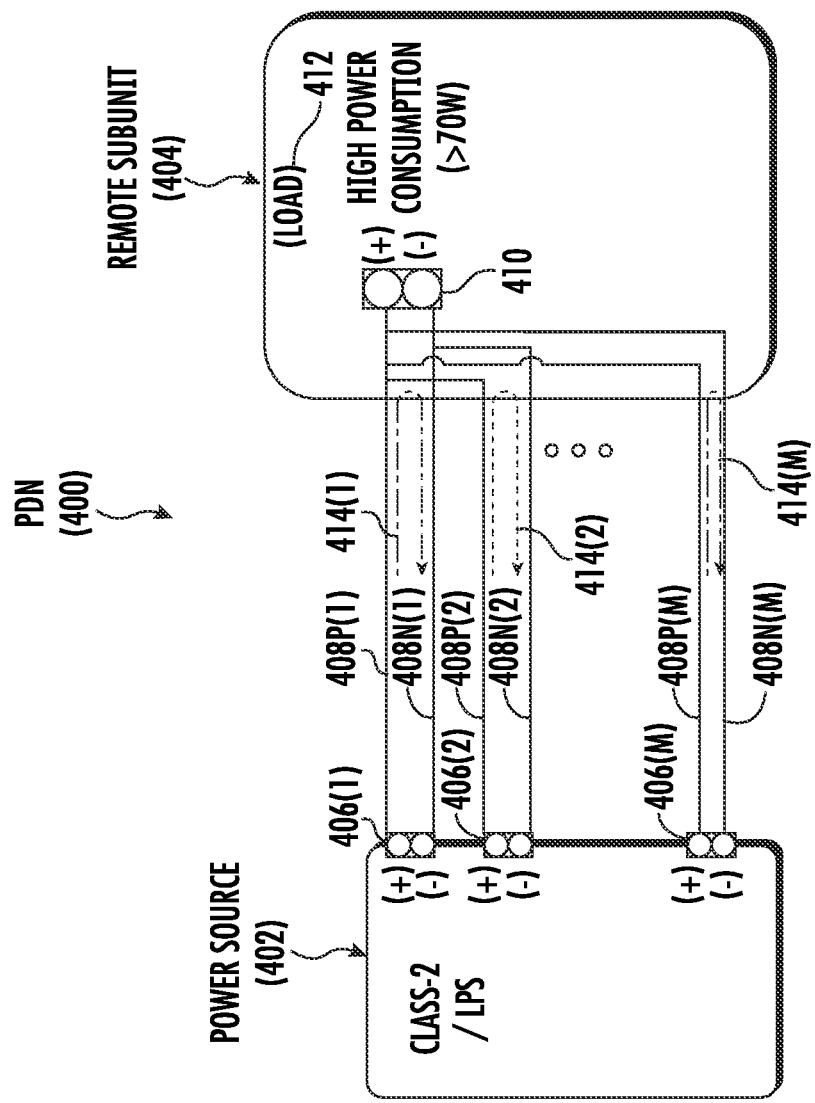
FIG. 4A is a block diagram showing a conventional PDN where a remote sub-unit receives power from a power source through multiple conductors.

In this regard, FIG. 4A illustrates the PDN 400. Specifically, the PDN 400 includes a power source 402, which may be a limited power system (LPS) that complies with NEC Class-2. The PDN 400 further includes a remote sub-unit 404 (e.g., a remote antenna unit or the like). The power source 402 may include a first output port 406(1) that couples to conductors 408P(1), 408N(1), a second output port 406(2) that couples to conductors 408P(2), 408N(2), up through an mth output port 406(M) that couples to conductors 408P(M), 408N(M). Within the remote sub-unit 404, the conductors 408P(1)-408P(M) are connected at an input port 410, and the conductors 408N(1)-408(M) are connected at the input port 410. Current on a given conductor 408P flows from the respective output port 406 to the input port 410 and provides power to a load 412 within the remote sub-unit 404. Current returns from the input port 410 on respective conductors 408N to the respective output ports 406 as generally shown by dotted lines 414(1)-414(M).

Figure 4B:
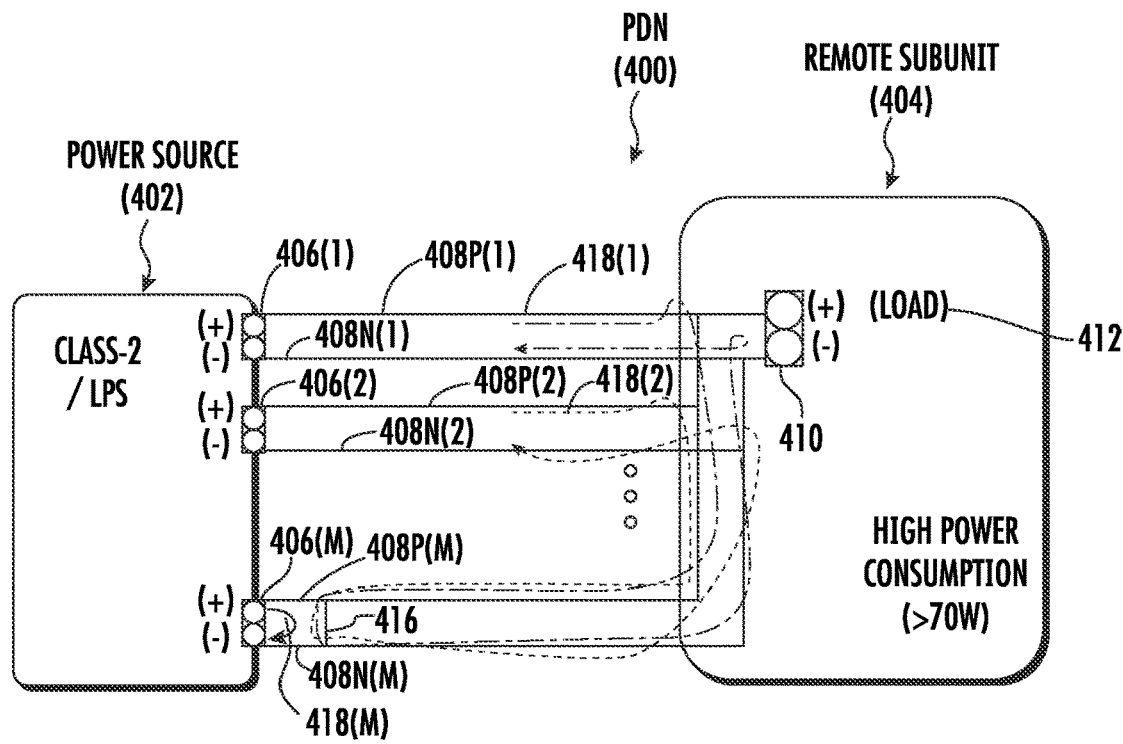
FIG. 4B is a block diagram of the PDN of FIG. 4A having a first type of fault in the conductors connecting the power source to the remote sub-unit.

A first fault condition is illustrated in FIG. 4B, where, for the sake of example, the PDN 400 has had a short 416 from across the conductors 408P(M) and 408N(M). Current 418 (1) on the conductor 408P(1) will arrive at the remote sub-unit 404 and pass to the conductor 408P(M), across the short 416, back through the conductor 408N(M), and then back through the conductor 408N(1). Similarly, current 418(2) on the conductor 408P(2) will arrive at the remote sub-unit 404 and pass to the conductor 408P(M), across the short 416, back through the conductor 408N(M), and then back through the conductor 408N(2). Current 418(M) leaving the output port 406(M) will cross the short 416 and return to the output port 406(M). The net result of the short 416 is that at least one conductor pair (e.g., 408P(M), 408N(M)) will have more than the normal current for at least a portion of its length and may exceed the rating for the conductor. This situation is undesirable.

Figure 4C:
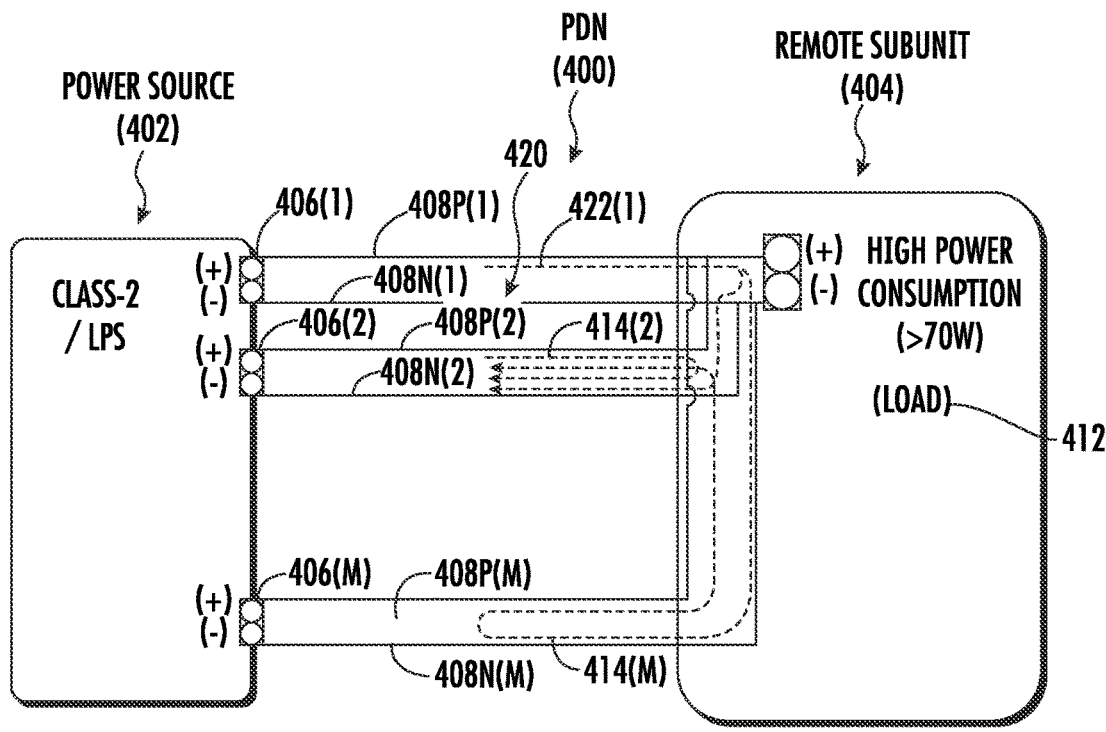
FIG. 4C is a block diagram of the PDN of FIG. 4A having a second type of fault in the conductors connecting the power source to the remote sub-unit.

FIG. 4C illustrates the PDN 400 with an open circuit instead of a short circuit. Such an open circuit is likewise undesirable as the open circuit may also cause current flow on a conductor to exceed the conductor rating. For the sake of example, the conductor 408N(1) has an open circuit 420. Current is not able to flow back on the conductor 408N(1). Therefore, some portion of current 422(1) will flow back on the conductors 408N(2)-408N(M). This additional current on these conductors 408N(2)-408N(M) may cause the current to exceed the rating for the conductor. Again, this situation is undesirable.

Conventional systems are aware of the fault conditions illustrated in FIGS. 4B and 4C. To address these fault conditions, conventional systems rely on a relatively expensive multiplexer in the remote sub-unit to combine the power from the various connections while precluding current from passing from one conductor to another in such a manner that would cause the connection to exceed the low-power format thresholds. Because there may be many remote sub-units in a given PDN, each such expensive multiplexer has a burden multiplied by the number of remote sub-units. This additional burden leaves room for a more cost effective solution.

Exemplary aspects of the present disclosure provide two solutions that prevent overcurrent situations that might exceed the low-power standards in the event of a short circuit or an open circuit. The first solution is to isolate galvanically output ports at the power source using a transformer for each output port. The second, more elegant solution is to add diodes to the remote sub-unit to prevent current backflow and monitor current levels on the conductors. When current levels on the conductors exceed a predefined threshold, switches are opened so that current does not flow on the conductors.

Figure 5:
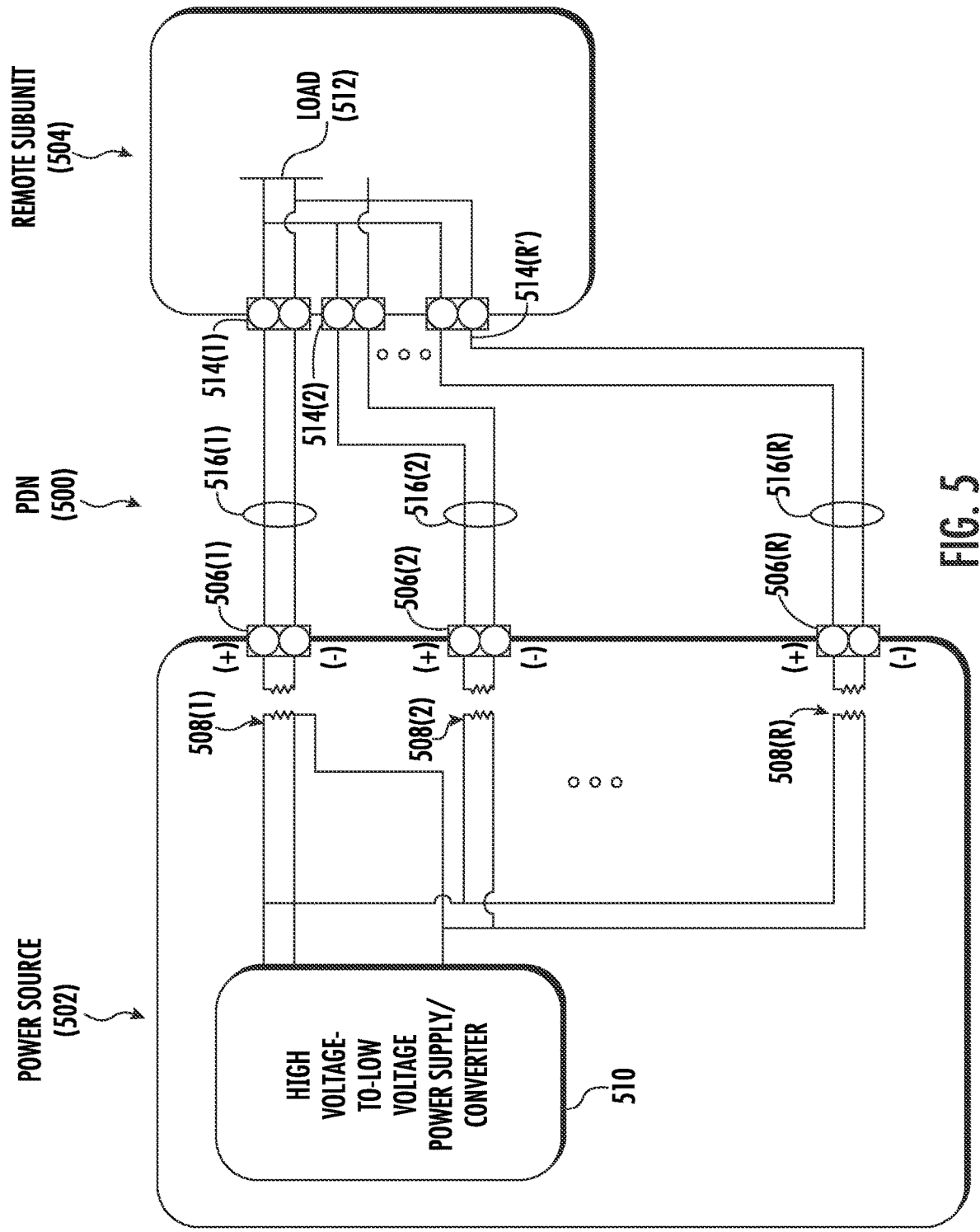
FIG. 5 is a block diagram of a PDN where the power source has galvanically-isolated output ports to prevent overcurrent conditions.

FIG. 5 provides a block diagram of a PDN 500 having a power source 502 coupled to a remote sub-unit 504. In particular, the power source 502 includes output ports 506(1)-506(R) where each of the output ports 506(1)-506(R) are galvanically isolated from one another. Galvanic isolation is a principle of isolating functional sections of electrical systems to prevent current flow; no direct conduction path is permitted. Energy or information can still be exchanged between the sections by other means, such as capacitance, induction, or electromagnetic waves, or by optical, acoustic, or mechanical means.

Galvanic isolation is used where two or more electric circuits must communicate, but their grounds may be at different potentials. It is an effective method of breaking ground loops by preventing unwanted current from flowing between two units sharing a ground conductor. The most common form of galvanic isolation is through a transformer, and the PDN 500 may use transformers 508(1)-508(R) to isolate the output ports 506(1)-506(R) from one another. In particular, the transformers 508(1)-508(R) may be positioned between the output ports 506(1)-506(R) and a high voltage-to-low voltage power supply/converter 510. The power supply/converter 510 may receive power from a high-voltage source such as a battery or an alternating current (AC) power source such as a high-voltage line connected to a public power grid (not shown). Other forms of galvanic isolation (not illustrated) include opto-isolators, capacitors, Hall effect sensors, magnetocouplers, and isolation relays.

With continued reference to FIG. 5, the remote sub-unit 504 may include a load 512 and power inputs 514(1)-514(R'), where R' may be equal to, greater than, or less than R depending on the requirements of the load 512 and the cumulative power available from the R output ports 506. The output ports 506(1)-506(R) are coupled to the power inputs 514(1)-514(R') by conductor pairs 516(1)-516(R). The power on the conductor pairs 516(1)-516(R) is summed inside the remote sub-unit 504 to provide sufficient power to the load 512.

While galvanic isolation is effective, the use of transformers 508 may be expensive and/or require relatively large amounts of space (i.e., transformers at these power levels are not small components). Accordingly, exemplary aspects of the present disclosure provide an alternate technique to address overcurrent situations that may occur as a function of a fault in the conductors or other source. In particular, exemplary aspects of the present disclosure contemplate adding diodes to the conductors in the remote sub-units to prevent undesired current flow. Additionally, exemplary aspects of the present disclosure add current sensors to the conductors at the power source. When the current sensors determine that an overcurrent situation is occurring, a control circuit may open a switch to interrupt current flow to prevent the overcurrent situation from continuing.

Figure 6:
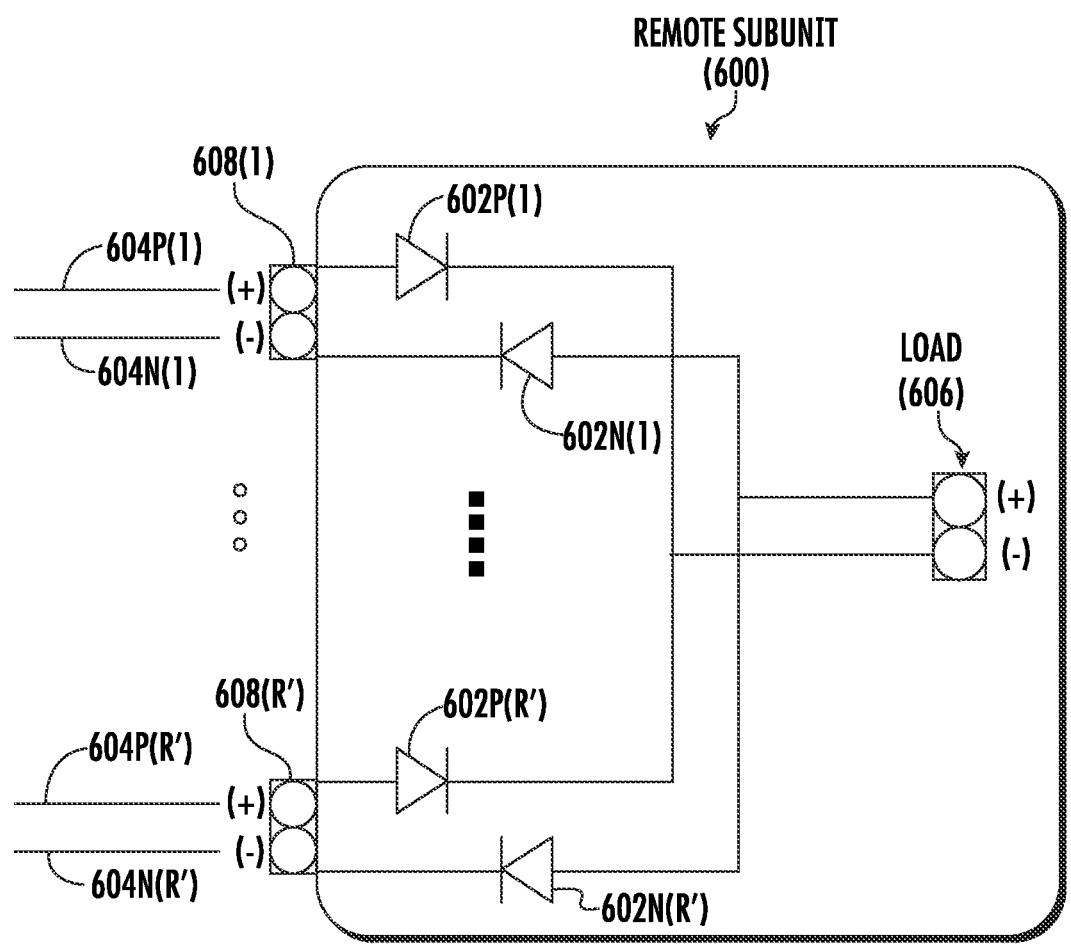
FIG. 6 is a block diagram of a remote sub-unit in a PDN, where the remote sub-unit is powered through a low-power conductor and has isolation between conductors provided by diodes.

FIG. 6 illustrates a remote sub-unit 600, analogous to the remote sub-unit 504 of FIG. 5, but including diodes 602P(1)-602P(R') for the positive conductors 604P(1)-604P(R') and diodes 602N(1)-602N(R') for the negative conductors 604N(1)-604(R'). Note that the diodes 602P(1)-602P(R') are optional. A load 606 receives the combined power from power inputs 608(1)-608(R') (analogous to the power inputs 514(1)-514(R') of FIG. 5).

By placing the diodes 602N(1)-602N(R') on the negative conductors 604N(1)-604N(R'), current cannot flow back into the remote sub-unit 600. Stopping such current flow effectively addresses the short circuit fault illustrated in FIG. 4B and prevents an overcurrent situation from such a short circuit. It should be appreciated that diodes capable of handling the current flows at the levels associated with low-power operation compliant with NEC-Class 2 are relatively inexpensive and consume relatively little space. The cost and size of such diodes helps keep the cost of the remote sub-unit 600 manageable particularly in installations where many remote sub-units are installed.

Figure 7:
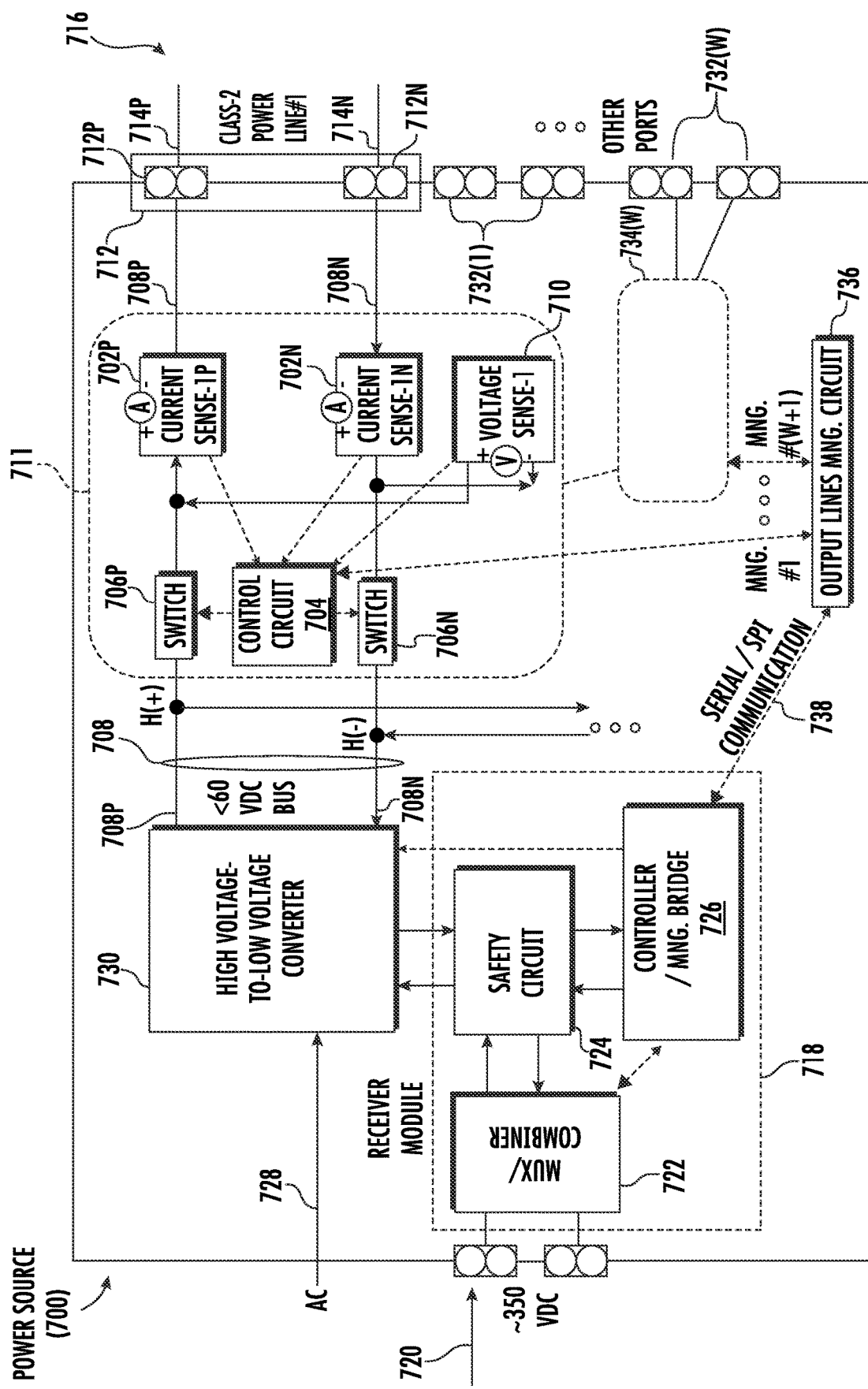
FIG. 7 is a block diagram of a power source with sensors including current and voltage sensors to assist in detection and correction of overcurrent situations.
Figure 8:
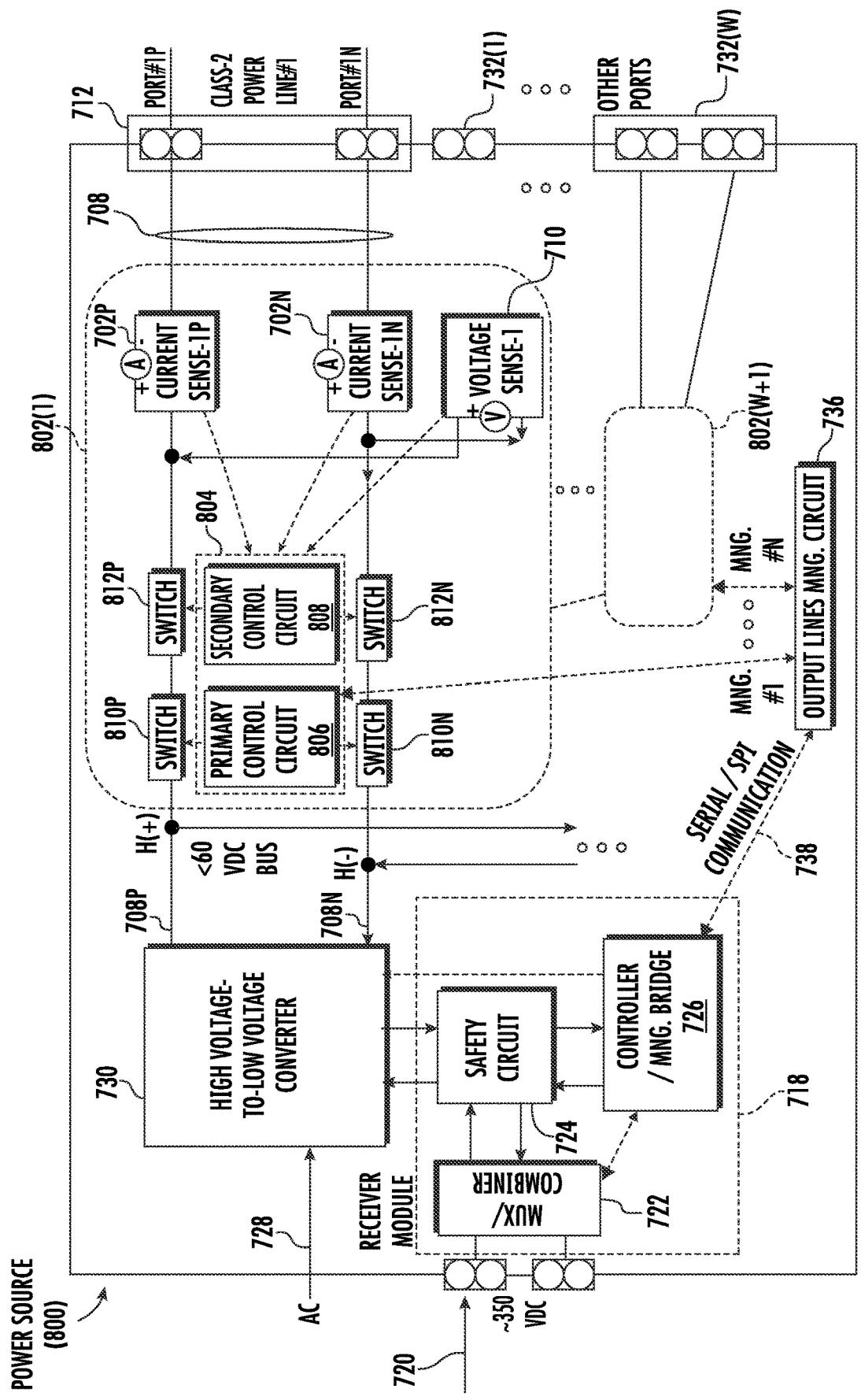
FIG. 8 is a block diagram of a power source similar to the power source of FIG. 7, but with redundant control circuits and switches to assist in detection and correction of overcurrent situations.

Further aspects of the present disclosure address the open circuit fault condition illustrated in FIG. 4C. Specifically, current sensors and switches are added to the power source. FIG. 7 illustrates a first power source 700 and FIG. 8 illustrates a second power source 800, similar to the first power source 700, but with redundant features for improved safety.

Turning specifically to FIG. 7, the first power source 700 has current sensors 702P and 702N which report current levels to a control circuit 704. The control circuit 704 controls switches 706P and 706N. The current sensors 702P, 702N and switches 706P, 706N are associated with (e.g., by being serially positioned within) conductors 708P, 708N within the power source 700 that collectively form a low-power (e.g., less than 60 V) bus 708. A voltage sensor 710 may also be coupled across the conductors 708P, 708N and report voltage levels to the control circuit 704. Collectively the sensors 702P, 702N, 710, switches 706P, 706N, and control circuit 704 may be referred to as an overcurrent safety system 711. The conductors 708P, 708N are coupled to an output port 712, which may have an individual positive output port 712P and negative output port 712N. The output port 712 is coupled to conductors 714P, 714N to form a first class-2 power line 716.

With continued reference to FIG. 7, the power source 700 may further include a receiver module 718 that receives a high-voltage (e.g., 350 V) direct current (DC) signal 720. This high-voltage DC signal 720 may go through a multiplexer or combiner 722 and interoperate with a safety circuit 724 and/or a controller 726. Alternatively, or in addition, the power source 700 may receive an AC power signal 728 such as from an external power grid (not shown). In an exemplary aspect, the AC power signal 728 is the primary source of power for the power source 700 while the high-voltage DC signal 720 may be from a battery backup. The power source 700 uses a high voltage-to-low voltage converter 730 to lower the incoming high-voltage signal to a low-power signal (e.g., less than 60 V) to be put on the bus 708. The controller 726 may further communicate with the high voltage-to-low voltage converter 730 (e.g., to pass an alarm of power failure or for other reasons as needed or desired).

The power source 700 may have additional output ports 732(1)-732(W), which may be functionally identical to the output port 712. Each of the additional output ports 732(1)-732(W) may also have associated overcurrent safety system 734(1)-734(W) (only 734(W) shown) identical to the overcurrent safety system 711. As an alternative, the control circuit 704 may be shared across all the overcurrent safety systems. Optionally, each output port 712 and 732(1)-732(W) may include a respective multiplexer (not shown) and/or a hot swap circuit. These optional elements may be positioned between the respective overcurrent protection systems and the output ports. Note that the bus 708 may be a common bus serving all the output ports 712, 732(1)-732(W) or each output port may have a respective isolated low-voltage line.

The power source 700 may further include a general management circuit 736 which may manage individual power levels on the bus 708, monitor the control circuits 704, and/or provide management information to the controller 726, which in turn may act as a management bridge for the high voltage-to-low voltage converter 730. In an exemplary aspect, a link 738 between the general management circuit 736 and the controller 726 is a serial peripheral interface (SPI) or other serial link.

FIG. 8 illustrates a power source 800 that is substantially similar to the power source 700, but has some redundant features to improve safety. Specifically, the overcurrent safety system 711 is replaced by an overcurrent safety system 802(1)-802(W+1) (one for each output port 712, 732(1)-732(W)). Each overcurrent safety system 802 includes the current sensors 702P, 704N and voltage sensor 710. However, the overcurrent safety system 802 includes an expanded control circuit 804, which may have a primary control circuit 806 and a secondary control circuit 808. The primary control circuit 806 controls first switches 810P, 810N, while the secondary control circuit 808 controls second switches 812P, 812N. By having two switches for each conductor 708P, 708N and two control circuits, there is an increased likelihood that the conductor 708P, 708N will be disconnected to stop an overcurrent situation even if one switch or control circuit fails.

Figure 9:
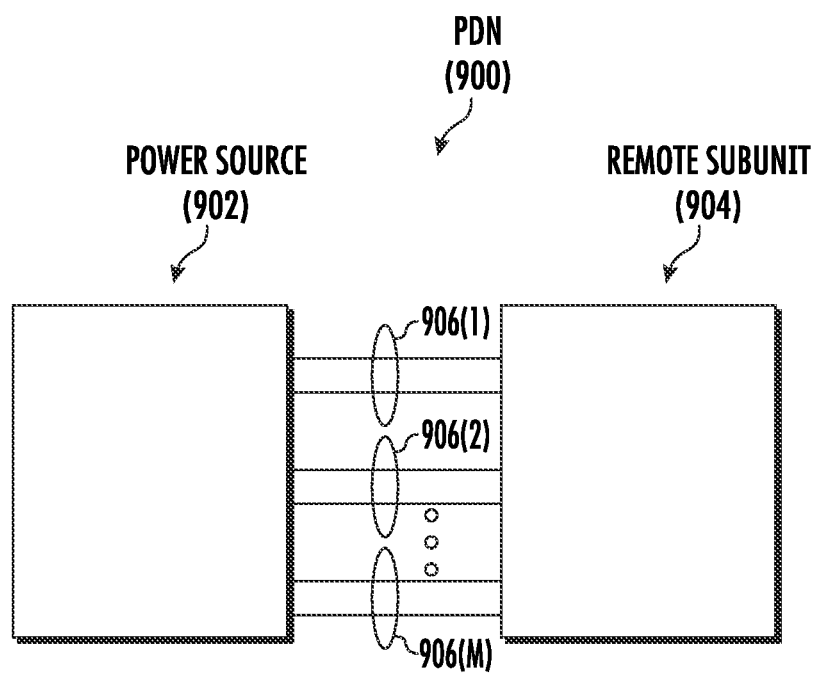
FIG. 9 is a block diagram of a PDN that may include the remote sub-unit of FIG. 6 and/or the power source of FIG. 7 or 8.

FIG. 9 shows a PDN 900 where a power source 902, which may be the first power source 700 of FIG. 7 or the second power source 800 of FIG. 8, is coupled to a remote sub-unit 904, which may be the remote sub-unit 600 of FIG. 6, by conductor pairs 906(1)-906(M). The PDN 900 may be adapted for use in any other system such as a lighting system, server farm, DCS, or the like (as generically shown in FIGS. 1-3).

Figure 13:
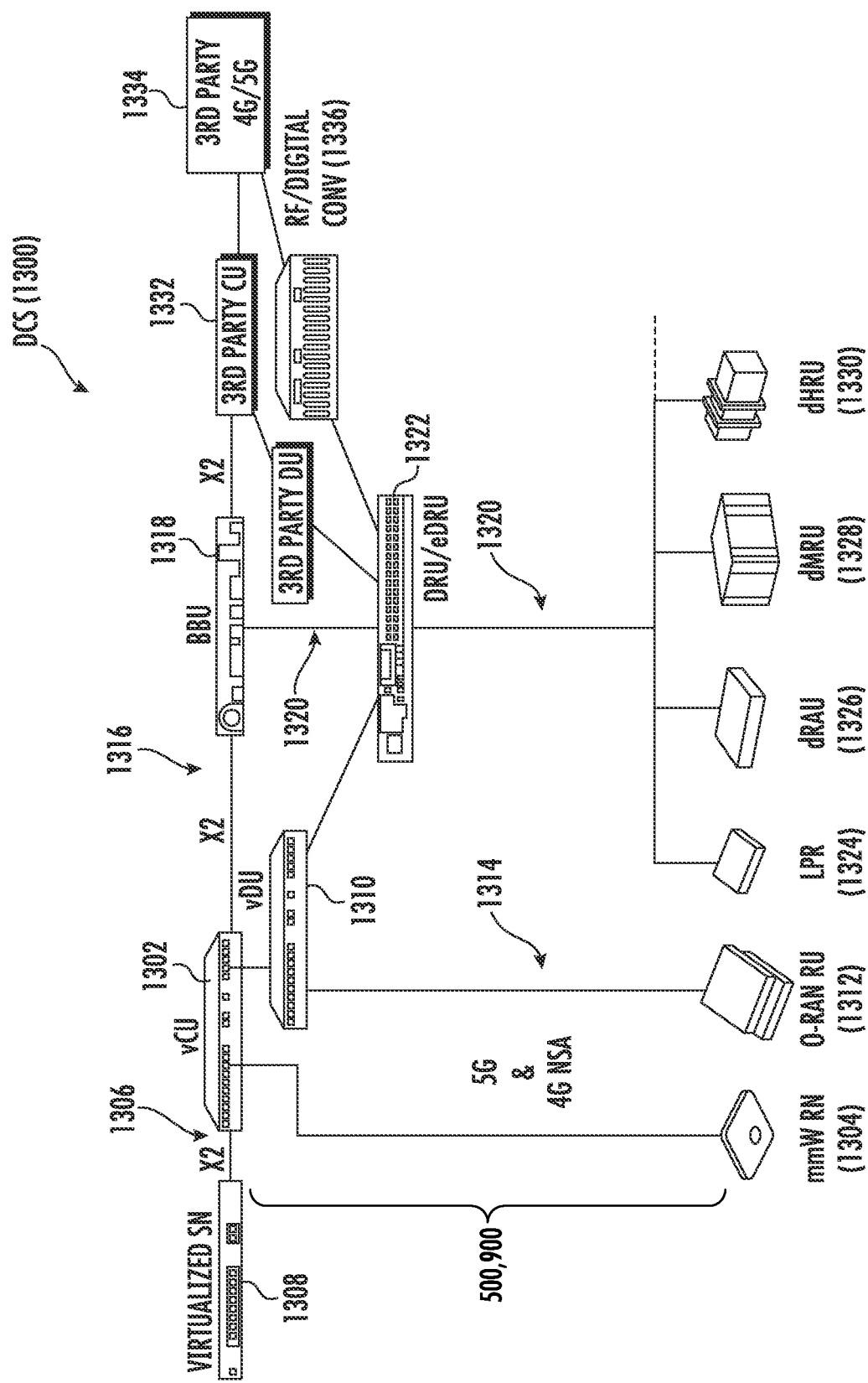
FIG. 13 is a schematic diagram an exemplary DCS that supports 4G and 5G communications services, and that can include one or more PDNs, including the PDNs in FIG. 5 or 9.
Figure 14:
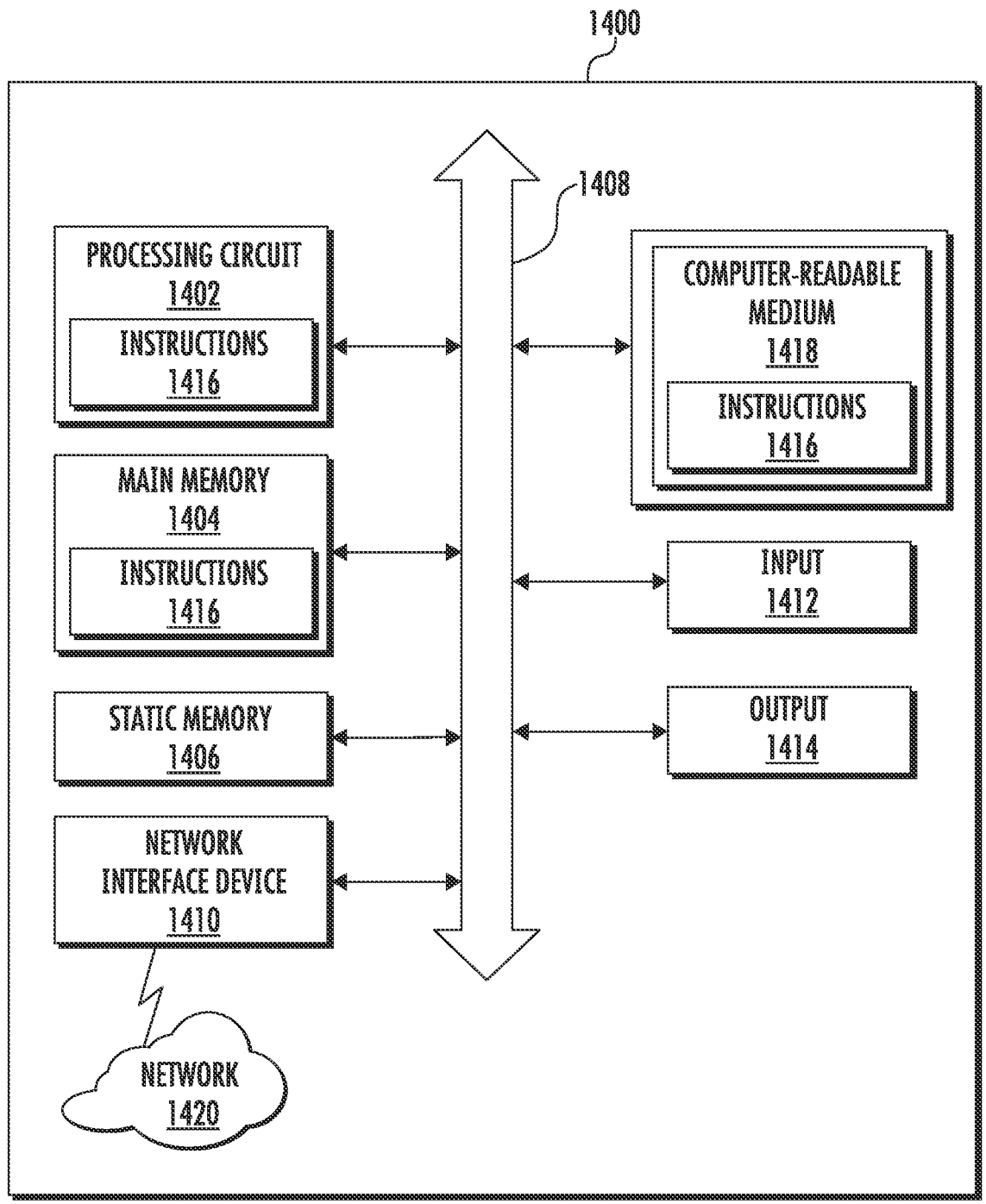
FIG. 14 is a schematic diagram of a generalized representation of an exemplary controller that can be included in any component or circuit in a power distribution system, including the PDNs in FIG. 5 or 9, wherein an exemplary computer system is adapted to execute instructions from an exemplary computer-readable link.

In the interests of completeness, one exemplary DCS having a power distribution network is explored below with reference to FIGS. 10-13 and an exemplary computer that may be used at various locations within a PDN is illustrated in FIG. 14. It should be appreciated that the precise context for the PDN is not central to the present disclosure.

Figure 10:
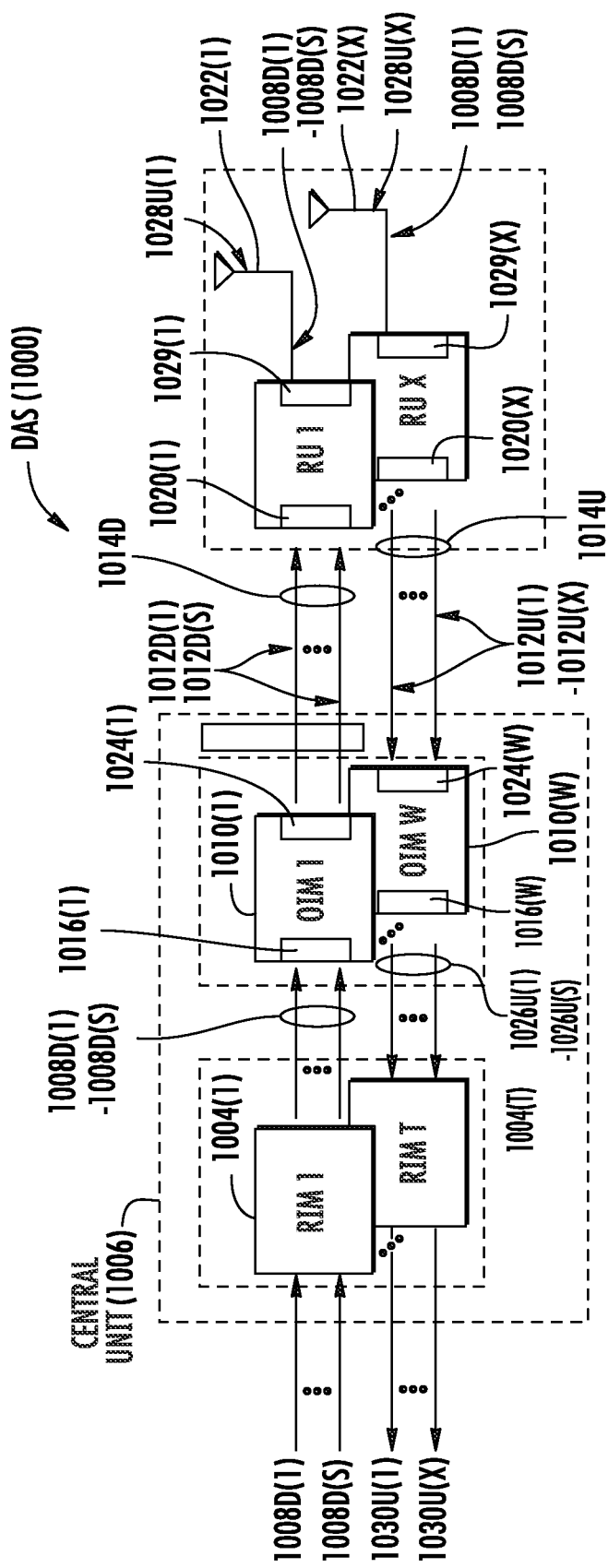
FIG. 10 is a schematic diagram of an exemplary optical fiber-based DCS configured to distribute communications signals between a central unit and a plurality of remote sub-units, and that can include one or more PDNs, including the PDNs in FIG. 5 or 9.

FIG. 10 is a schematic diagram of an exemplary optical fiber-based distributed antenna system (DAS) 1000 in which a PDN can be provided. In this example, the PDN 500 of FIG. 5 or the PDN 900 of FIG. 9 is provided in a DCS which is the DAS 1000 in this example. Note that the PDNs 500 or 900 are not limited to being provided in a DCS. A DAS is a system that is configured to distribute communications signals, including wireless communications signals, from a central unit to a plurality of remote sub-units over physical communications media, to then be distributed from the remote sub-units wirelessly to client devices in wireless communication range of a remote unit. The DAS 1000 in this example is an optical fiber-based DAS that is comprised of three (3) main components. One or more radio interface circuits provided in the form of radio interface modules (RIMS) 1004(1)-1004(T) are provided in a central unit 1006 to receive and process downlink electrical communications signals 1008D(1)-1008D(S) prior to optical conversion into downlink optical communications signals. The downlink electrical communications signals 1008D(1)-1008D(S) may be received from a base transceiver station (BTS) or base-band unit (BBU) as examples. The downlink electrical communications signals 1008D(1)-1008D(S) may be analog signals or digital signals that can be sampled and processed as digital information. The RIMs 1004(1)-1004(T) provide both downlink and uplink interfaces for signal processing. The notations "1-S" and "1-T" indicate that any number of the referenced component, 1-S and 1-T, respectively, may be provided.

With continuing reference to FIG. 10, the central unit 1006 is configured to accept the plurality of RIMs 1004(1)-1004(T) as modular components that can easily be installed and removed or replaced in a chassis. In one embodiment, the central unit 1006 is configured to support up to twelve (12) RIMS 1004(1)-1004(12). Each RIM 1004(1)-1004(T) can be designed to support a particular type of radio source or range of radio sources (i.e., frequencies) to provide flexibility in configuring the central unit 1006 and the DAS 1000 to support the desired radio sources. For example, one RIM 1004(1)-1004(T) may be configured to support the Personal Communication Services (PCS) radio band. Another RIM 1004(1)-1004(T) may be configured to support the 700 MHz radio band. In this example, by inclusion of these RIMS 1004(1)-1004(T), the central unit 1006 could be configured to support and distribute communications signals, including those for the communications services and communications bands described above as examples.

The RIMs 1004(1)-1004(T) may be provided in the central unit 1006 that support any frequencies desired, including, but not limited to, licensed US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 10, the received downlink electrical communications signals 1008D(1)-1008D(S) are provided to a plurality of optical interfaces provided in the form of optical interface modules (OIMs) 1010(1)-1010(W) in this embodiment to convert the downlink electrical communications signals 1008D(1)-1008D(S) into downlink optical communications signals 1012D(1)-1012D(S). The notation "1-W" indicates that any number of the referenced component 1-W may be provided. The OIMs 1010(1)-1010(W) may include one or more optical interface components (OICs) that contain electrical-to-optical (E-O) converters 1016(1)-1016(W) to convert the received downlink electrical communications signals 1008D(1)-1008D(S) into the downlink optical communications signals 1012D(1)-1012D(S). The OIMs 1010(1)-1010(W) support the radio bands that can be provided by the RIMs 1004(1)-1004(T), including the examples previously described above. The downlink optical communications signals 1012D(1)-1012D(S) are communicated over a downlink optical fiber communications link 1014D to a plurality of remote sub-units (e.g., remote sub-units 504, 904) provided in the form of remote sub-units in this example. One or more of the downlink optical communications signals 1012D(1)-1012D(S) can be distributed to each remote sub-unit. Thus, the distribution of the downlink optical communications signals 1012D(1)-1012D(S) from the central unit 1006 to the remote sub-units is in a point-to-multipoint configuration in this example.

With continuing reference to FIG. 10, the remote sub-units include optical-to-electrical (O-E) converters 1020(1)-1020(X) configured to convert the one or more received downlink optical communications signals 1012D(1)-1012D(S) back into the downlink electrical communications signals 1008D(1)-1008D(S) to be wirelessly radiated through antennas 1022(1)-1022(X) in the remote sub-units to user equipment (not shown) in the reception range of the antennas 1022(1)-1022(X). The notation "1-X" indicates that any number of the referenced component 1-X may be provided. The OIMs 1010(1)-1010(W) may also include O-E converters 1024(1)-1024(W) to convert received uplink optical communications signals 1012U(1)-1012U(X) from the remote sub-units into uplink electrical communications signals 1026U(1)-1026U(S) as will be described in more detail below.

With continuing reference to FIG. 10, the remote sub-units are also configured to receive uplink electrical communications signals 1028U(1)-1028U(X) received by the respective antennas 1022(1)-1022(X) from client devices in wireless communication range of the remote sub-units. The uplink electrical communications signals 1028U(1)-1028U(S) may be analog signals or digital signals that can be sampled and processed as digital information. The remote sub-units include E-O converters 1029(1)-1029(X) to convert the received uplink electrical communications signals 1028U(1)-1028U(X) into uplink optical communications signals 1012U(1)-1012U(X). The remote sub-units distribute the uplink optical communications signals 1012U(1)-1012U(X) over an uplink optical fiber communications link 1014U to the OIMs 1010(1)-1010(W) in the central unit 1006. The O-E converters 1024(1)-1024(W) convert the received uplink optical communications signals 1012U(1)-1012U(X) into uplink electrical communications signals 1030U(1)-1030U(X), which are processed by the RIMs 1004(1)-1004(T) and provided as the uplink electrical communications signals 1030U(1)-1030U(X) to a source transceiver such as a BTS or BBU.

Note that the downlink optical fiber communications link 1014D and the uplink optical fiber communications link 1014U coupled between the central unit 1006 and the remote sub-units may be a common optical fiber communications link, wherein for example, wave division multiplexing (WDM) may be employed to carry the downlink optical communications signals 1012D(1)-1012D(S) and the uplink optical communications signals 1012U(1)-1012U(X) on the same optical fiber communications link. Alternatively, the downlink optical fiber communications link 1014D and the uplink optical fiber communications link 1014U coupled between the central unit 1006 and the remote sub-units may be single, separate optical fiber communications links, wherein for example, wave division multiplexing (WDM) may be employed to carry the downlink optical communications signals 1012D(1)-1012D(S) on one common downlink optical fiber and the uplink optical communications signals 1012U(1)-1012U(X) on a separate, only uplink optical fiber. Alternatively, the downlink optical fiber communications link 1014D and the uplink optical fiber communications link 1014U coupled between the central unit 1006 and the remote sub-units may be separate optical fibers dedicated to and providing a separate communications link between the central unit 1006 and each remote sub-unit.

Figure 11:
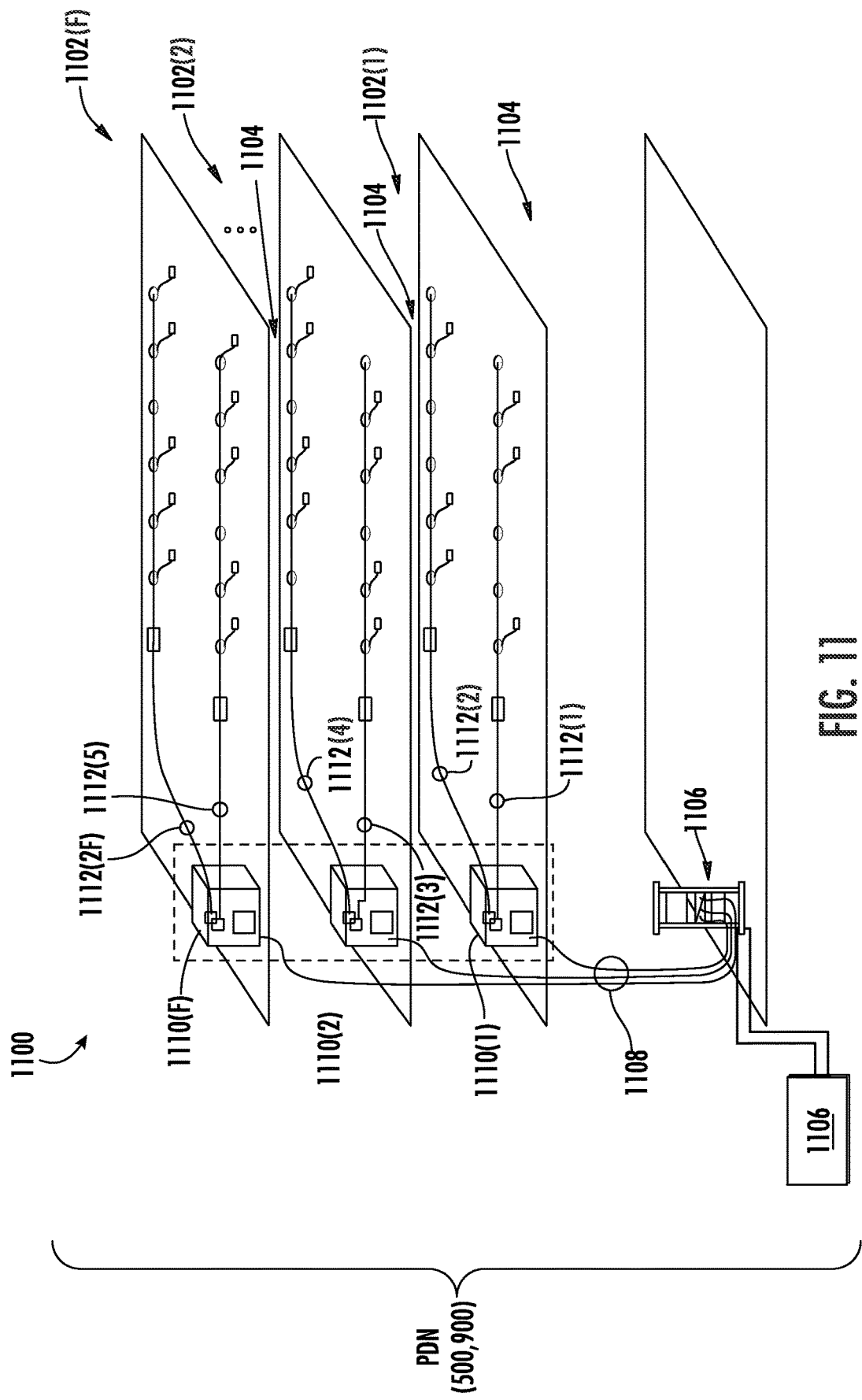
FIG. 11 is a partially schematic cut-away diagram of an exemplary building infrastructure in which the DCS in FIG. 10 can be provided.

The DAS 1000 and its PDN 500 or 900 can be provided in an indoor environment as illustrated in FIG. 11. FIG. 11 is a partially schematic cut-away diagram of a building infrastructure 1100 employing the PDN 500 of FIG. 5 or the PDN 900 of FIG. 9. The building infrastructure 1100 in this embodiment includes a first (ground) floor 1102(1), a second floor 1102(2), and an Fth floor 1102(F), where 'F' can represent any number of floors. The floors 1102(1)-1102(F) are serviced by the central unit 1006 to provide antenna coverage areas 1104 in the building infrastructure 1100. The central unit 1006 is communicatively coupled to a signal source 1106, such as a BTS or BBU, to receive the downlink electrical communications signals 1008D(1)-1008D(S). The central unit 1006 is communicatively coupled to the remote sub-units to receive uplink optical communications signals 1012U(1)-1012U(X) from the remote sub-units as previously described in FIG. 10. The downlink and uplink optical communications signals 1012D(1)-1012D(S), 1012U(1)-1012U(X) are distributed between the central unit 1006 and the remote sub-units over a riser cable 1108 in this example. The riser cable 1108 may be routed through interconnect units (ICUs) 1110(1)-1110(F) dedicated to each floor 1102(1)-1102(F) for routing the downlink and uplink optical communications signals 1012D(1)-1012D(S), 1012U(1)-1012U(X) to the remote sub-units. The ICUs 1110(1)-1110(F) may also include respective power distribution circuits that include power sources as part of the PDN 500, 900, wherein the power distribution circuits are configured to distribute power remotely to the remote sub-units to provide power for operating the power-consuming components in the remote sub-units. For example, array cables 1112(1)-1112(2F) may be provided and coupled between the ICUs 1110(1)-1110(F) that contain both optical fibers to provide the respective downlink and uplink optical fiber communications media 1014D(1)-1014D(2F), 1014U(1)-1014U(2F) and power conductors (e.g., electrical wire) to carry current from the respective power distribution circuits to the remote sub-units.

Figure 12:
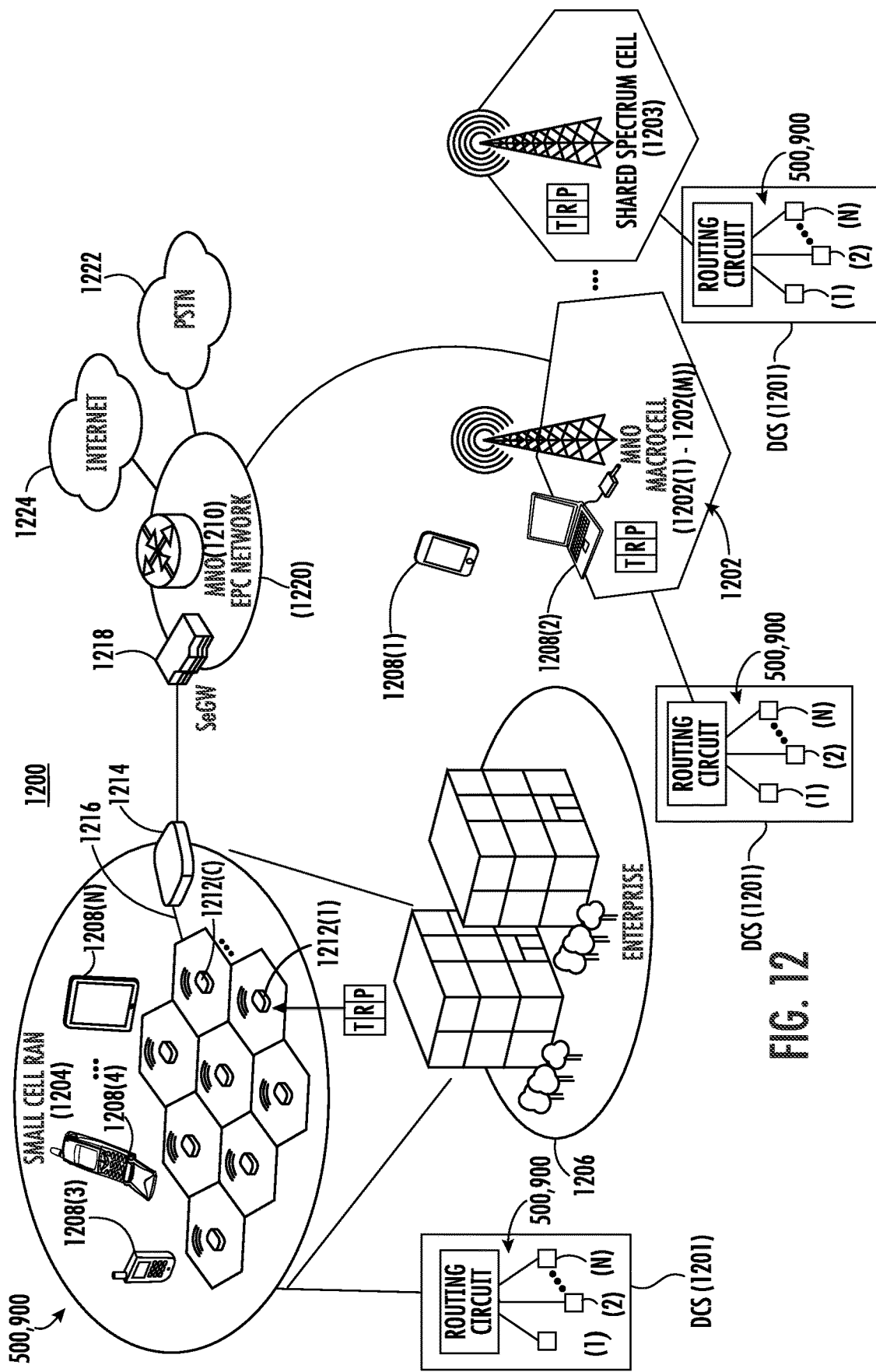
FIG. 12 is a schematic diagram of an exemplary mobile telecommunications environment that includes an exemplary radio access network (RAN) that includes a mobile network operator (MNO) macrocell employing a radio node, a shared spectrum cell employing a radio node, an exemplary small cell RAN employing a multi-operator radio node located within an enterprise environment as DCSs, and that can include one or more PDNs, including the PDNs in FIG. 5 or 9.

FIG. 12 is a schematic diagram of an exemplary mobile telecommunications environment 1200 that includes an exemplary radio access network (RAN) that includes a mobile network operator (MNO) macrocell employing a radio node, a shared spectrum cell employing a radio node, an exemplary small cell RAN employing a multi-operator radio node located within an enterprise environment as DCSs, and that can include one or more PDN, including the PDN 500 of FIG. 5 or the PDN 900 of FIG. 9. The environment 1200 includes exemplary macrocell RANs 1202(1)-1202(M) ("macrocells 1202(1)-1202(M)") and an exemplary small cell RAN 1204 located within an enterprise environment 1206 and configured to service mobile communications between a user mobile communications device 1208(1)-1208(N) to an MNO 1210. A serving RAN for a user mobile communications device 1208(1)-1208(N) is a RAN or cell in the RAN in which the user mobile communications devices 1208(1)-1208(N) have an established communications session with the exchange of mobile communications signals for mobile communications. Thus, a serving RAN may also be referred to herein as a serving cell. For example, the user mobile communications devices 1208 (3)-1208(N) in FIG. 12 are being serviced by the small cell RAN 1204, whereas user mobile communications devices 1208(1) and 1208(2) are being serviced by the macrocell 1202. The macrocell 1202 is an MNO macrocell in this example. However, a shared spectrum RAN 1203 (also referred to as "shared spectrum cell 1203") includes a macrocell in this example and supports communications on frequencies that are not solely licensed to a particular MNO and thus may service user mobile communications devices 1208(1)-1208(N) independent of a particular MNO. For example, the shared spectrum cell 1203 may be operated by a third party that is not an MNO and wherein the shared spectrum cell 1203 supports Citizen Broadband Radio Service (CBRS). Also, as shown in FIG. 12, the MNO macrocell 1202, the shared spectrum cell 1203, and/or the small cell RAN 1204 can interface with a shared spectrum DCS 1201 supporting coordination of distribution of shared spectrum from multiple service providers to remote sub-units to be distributed to subscriber devices. The MNO macrocell 1202, the shared spectrum cell 1203, and the small cell RAN 1204 may be neighboring radio access systems to each other, meaning that some or all can be in proximity to each other such that a user mobile communications device 1208(1)-1208(N) may be able to be in communications range of two or more of the MNO macrocell 1202, the shared spectrum cell 1203, and the small cell RAN 1204 depending on the location of user mobile communications devices 1208(1)-1208(N).

In FIG. 12, the mobile telecommunications environment 1200 in this example is arranged as an LTE (Long Term Evolution) system as described by the Third Generation Partnership Project (3GPP) as an evolution of the GSM/UMTS standards (Global System for Mobile communication/Universal Mobile Telecommunications System). It is emphasized, however, that the aspects described herein may also be applicable to other network types and protocols. The mobile telecommunications environment 1200 includes the enterprise environment 1206 in which the small cell RAN 1204 is implemented. The small cell RAN 1204 includes a plurality of small cell radio nodes 1212(1)-1212(C). Each small cell radio node 1212(1)-1212(C) has a radio coverage area (graphically depicted in the drawings as a hexagonal shape) that is commonly termed a "small cell." A small cell may also be referred to as a femtocell or, using terminology defined by 3GPP, as a Home Evolved Node B (HeNB). In the description that follows, the term "cell" typically means the combination of a radio node and its radio coverage area unless otherwise indicated.

In FIG. 12, the small cell RAN 1204 includes one or more services nodes (represented as a single services node 1214) that manage and control the small cell radio nodes 1212(1)-1212(C). In alternative implementations, the management and control functionality may be incorporated into a radio node, distributed among nodes, or implemented remotely (i.e., using infrastructure external to the small cell RAN 1204). The small cell radio nodes 1212(1)-1212(C) are coupled to the services node 1214 over a direct or local area network (LAN) connection 1216 as an example, typically using secure IPsec tunnels. The small cell radio nodes 1212(1)-1212(C) can include multi-operator radio nodes. The services node 1214 aggregates voice and data traffic from the small cell radio nodes 1212(1)-1212(C) and provides connectivity over an IPsec tunnel to a security gateway (SeGW) 1218 in a network 1220 (e.g., evolved packet core (EPC) network in a 4G network, or 5G Core in a 5G network) of the MNO 1210. The network 1220 is typically configured to communicate with a public switched telephone network (PSTN) 1222 to carry circuit-switched traffic, as well as for communicating with an external packet-switched network such as the Internet 1224.

The environment 1200 also generally includes a node (e.g., eNodeB or gNodeB) base station, or "macrocell" 1202. The radio coverage area of the macrocell 1202 is typically much larger than that of a small cell where the extent of coverage often depends on the base station configuration and surrounding geography. Thus, a given user mobile communications device 1208(1)-1208(N) may achieve connectivity to the network 1220 (e.g., EPC network in a 4G network, or 5G Core in a 5G network) through either a macrocell 1202 or small cell radio node 1212(1)-1212(C) in the small cell RAN 1204 in the environment 1200.

FIG. 13 is a schematic diagram illustrating exemplary DCSs 1300 that support 4G and 5G communications services. The DCSs 1300 in FIG. 13 can include one or more PDNs, including the PDN 500 in FIG. 5 or the PDN 900 of FIG. 9. The DCSs 1300 support both legacy 4G LTE, 4G/5G non-standalone (NSA), and 5G communications systems. As shown in FIG. 13, a centralized services node 1302 is provided that is configured to interface with a core network to exchange communications data and distribute the communications data as radio signals to remote sub-units. In this example, the centralized services node 1302 is configured to support distributed communications services to a millimeter wave (mmW) radio node 1304. The functions of the centralized services node 1302 can be virtualized through an x2 interface 1306 to another services node 1308. The centralized services node 1302 can also include one or more internal radio nodes that are configured to be interfaced with a distribution node 1310 to distribute communications signals for the radio nodes to an open RAN (O-RAN) remote unit 1312 that is configured to be communicatively coupled through an O-RAN interface 1314.

The centralized services node 1302 can also be interfaced through an x2 interface 1316 to a BBU 1318 that can provide a digital signal source to the centralized services node 1302. The BBU 1318 is configured to provide a signal source to the centralized services node 1302 to provide radio source signals 1320 to the O-RAN remote unit 1312 as well as to a distributed router unit (DRU) 1322 as part of a digital DAS. The DRU 1322 is configured to split and distribute the radio source signals 1320 to different types of remote sub-units, including a lower-power remote unit (LPR) 1324, a radio antenna unit (dRAU) 1326, a mid-power remote unit (dMRU) 1328, and a high-power remote unit (dHRU) 1330. The BBU 1318 is also configured to interface with a third party central unit 1332 and/or an analog source 1334 through a radio frequency (RF)/digital converter 1336.

FIG. 14 is a schematic diagram representation of additional detail illustrating a computer system 1400 that could be employed in any component or circuit in a PDN, including the PDN 500 or 900 in FIG. 5 or 9. In this regard, the computer system 1400 is adapted to execute instructions from an exemplary computer-readable medium to perform these and/or any of the functions or processing described herein. The computer system 1400 in FIG. 14 may include a set of instructions that may be executed to program and configure programmable digital signal processing circuits in a DCS for supporting scaling of supported communications services. The computer system 1400 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 1400 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 1400 in this embodiment includes a processing circuit or processor 1402, a main memory 1404 (e.g., read-only memory (ROM), flash memory, dynamic random access memory (DRAM), such as synchronous DRAM (SDRAM), etc.), and a static memory 1406 (e.g., flash memory, static random access memory (SRAM), etc.), which may communicate with each other via a data bus 1408. Alternatively, the processor 1402 may be connected to the main memory 1404 and/or static memory 1406 directly or via some other connectivity means. The processor 1402 may be a controller, and the main memory 1404 or static memory 1406 may be any type of memory.

The processor 1402 represents one or more general-purpose processing devices, such as a microprocessor, central processing unit, or the like. More particularly, the processor 1402 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 1402 is configured to execute processing logic in instructions for performing the operations and steps discussed herein.

The computer system 1400 may further include a network interface device 1410. The computer system 1400 also may or may not include an input 1412, configured to receive input and selections to be communicated to the computer system 1400 when executing instructions. The computer system 1400 also may or may not include an output 1414, including, but not limited to, a display, a video display unit (e.g., a liquid crystal display (LCD) or a cathode ray tube (CRT)), an alphanumeric input device (e.g., a keyboard), and/or a cursor control device (e.g., a mouse).

The computer system 1400 may or may not include a data storage device that includes instructions 1416 stored in a computer-readable medium 1418. The instructions 1416 may also reside, completely or at least partially, within the main memory 1404 and/or within the processor 1402 during execution thereof by the computer system 1400, the main memory 1404 and the processor 1402 also constituting computer-readable medium. The instructions 1416 may further be transmitted or received over a network 1420 via the network interface device 1410.

While the computer-readable medium 1418 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.), a machine-readable transmission medium (electrical, optical, acoustical or other form of propagated signals (e.g., carrier waves, infrared signals, digital signals, etc.)), etc.

Unless specifically stated otherwise as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art would further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information may be represented using any of a variety of different technologies and techniques. For example, data, instructions, commands, information, bits, symbols, and chips that may be referenced throughout the above description may be represented by voltages, currents, electromagnetic waves, magnetic fields or particles, optical fields or particles, or any combination thereof.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163, the disclosures of which are incorporated herein by reference in their entireties.

Many modifications and other embodiments of the embodiments set forth herein will come to mind to one skilled in the art to which the embodiments pertain having the benefit of the teachings presented in the foregoing descriptions and the associated drawings. For example, the antenna arrangements may include any type of antenna desired, including but not limited to dipole, monopole, and slot antennas. The distributed antenna systems that employ the antenna arrangements disclosed herein could include any type or number of communications mediums, including but not limited to electrical conductors, optical fiber, and air (i.e., wireless transmission). The distributed antenna systems may distribute and the antenna arrangements disclosed herein may be configured to transmit and receive any type of communications signals, including but not limited to RF communications signals and digital data communications signals, examples of which are described in U.S. patent application Ser. No. 12/892,424 entitled "Providing Digital Data Services in Optical Fiber-based Distributed Radio Frequency (RF) Communications Systems, And Related Components and Methods," published as U.S. Patent Application Publication No. 2011/0268446, incorporated herein by reference in its entirety. Multiplexing, such as WDM and/or FDM, may be employed in any of the distributed antenna systems described herein, such as according to the examples provided in U.S. patent application Ser. No. 12/892,424.

Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A remote sub-unit, comprising:
   a power input port configured to be coupled to two power conductors;
   a first diode coupled to the power input port and a first one of the two power conductors;
   a second diode coupled to the power input port and a second one of the two power conductors;
   a load coupled to the power input port and configured to receive power from the first one of the two power conductors, wherein the load is configured to consume more than one hundred Watts (100 W) of power; and
   a plurality of input ports configured to be coupled to power conductor pairs, wherein the plurality of input ports are electrically connected to the power input port such that power received therefrom may be summed before being provided to the load.

2. The remote sub-unit of claim 1, wherein:
   the first diode is configured to prevent reverse current flow onto the first one of the two power conductors; and
   the second diode is configured to prevent reverse current flow from the second one of the two power conductors.

3. The remote sub-unit of claim 1, wherein the remote sub-unit comprises a remote antenna unit.

* * * * *